March 23, 1937.  E. T. SCHROTH  2,074,623
HIGHWAY STRIPER
Filed April 22, 1936    5 Sheets-Sheet 3

Inventor
Elmer T. Schroth
By Clarence A. O'Brien and
Hyman Berman
Attorneys

March 23, 1937.     E. T. SCHROTH     2,074,623
HIGHWAY STRIPER
Filed April 22, 1936     5 Sheets-Sheet 4
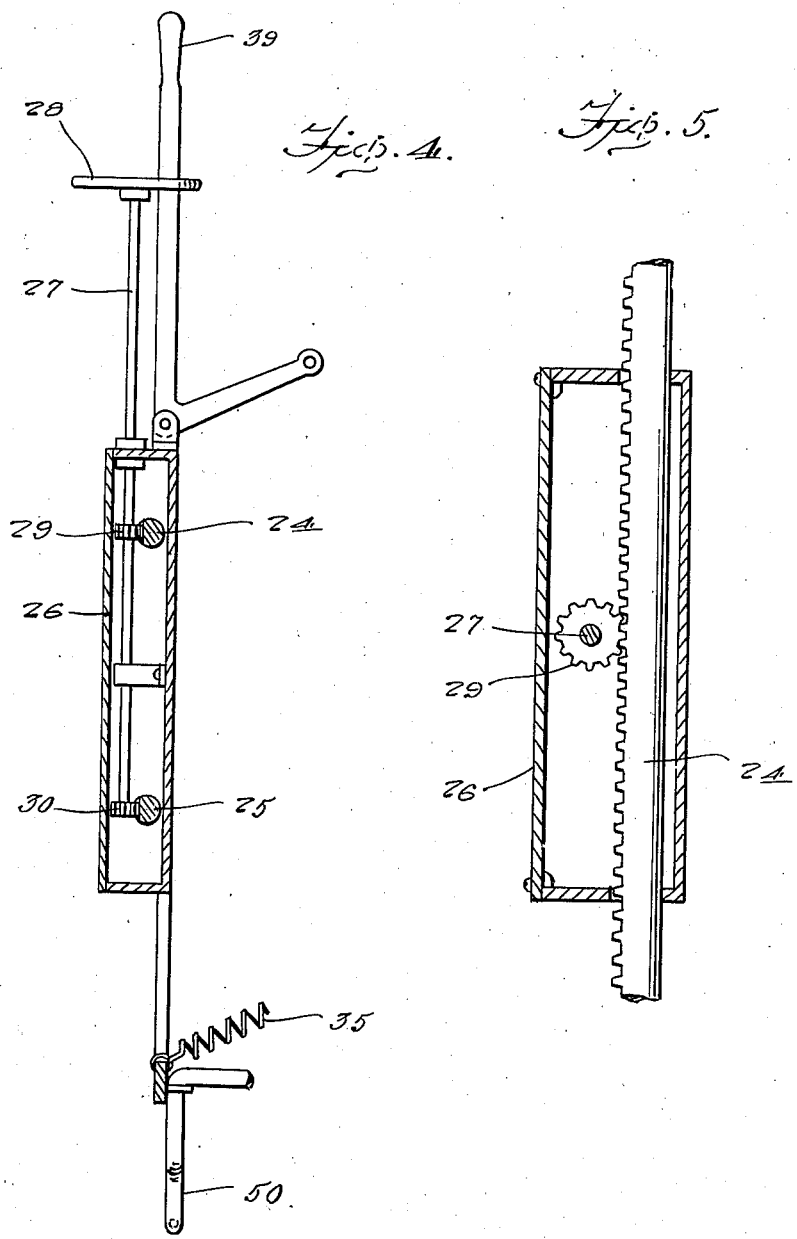
Inventor
Elmer T. Schroth
By Clarence A. O'Brien and
Hyman Berman
Attorneys March 23, 1937.  E. T. SCHROTH  2,074,623
HIGHWAY STRIPER
Filed April 22, 1936  5 Sheets-Sheet 5
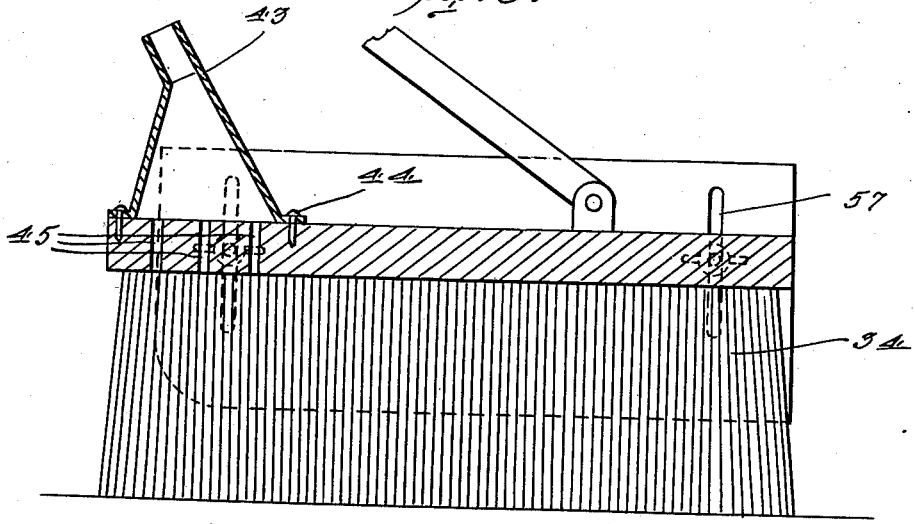
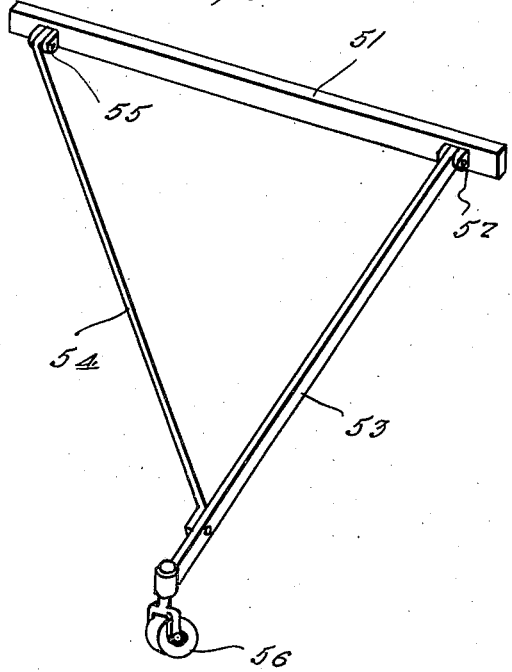
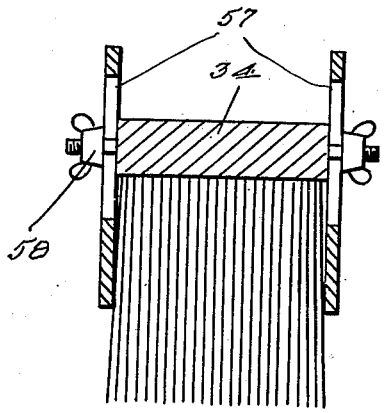
Inventor
Elmer T. Schroth
By Clarence A. O'Brien and
Hyman Berman
Attorneys Patented Mar. 23, 1937

2,074,623

UNITED STATES PATENT OFFICE 2,074,623

HIGHWAY STRIPER

Elmer T. Schroth, Carrolltown, Pa.

Application April 22, 1936, Serial No. 75,850

8 Claims. (Cl. 91—39)

This invention relates to means for applying traffic stripes to roadways, and the object of the invention is to provide a device of the character mentioned, which may be readily mounted on a vehicle, preferably a motor vehicle, to the end that the painting of the stripe may be accomplished in a manner less expensive, yet more efficiently than heretofore has been the case.

The invention, together with its objects and advantages, will be best understood from a study of the following description taken in connection with the accompanying drawings, wherein:

Figure 3 is an elevational view illustrating certain details hereinafter more fully referred to.

Figure 4 is a vertical detailed view partly in section and partly in elevation, showing certain details hereinafter more fully referred to.

Figure 5 is a fragmentary detailed sectional view of a rack and pinion mechanism.

Figure 6 is a sectional view through a brush and associated parts.

Figure 7 is a transverse sectional view through the brush.

Figure 8 is a perspective view of a guide assembly.

Figure 1:
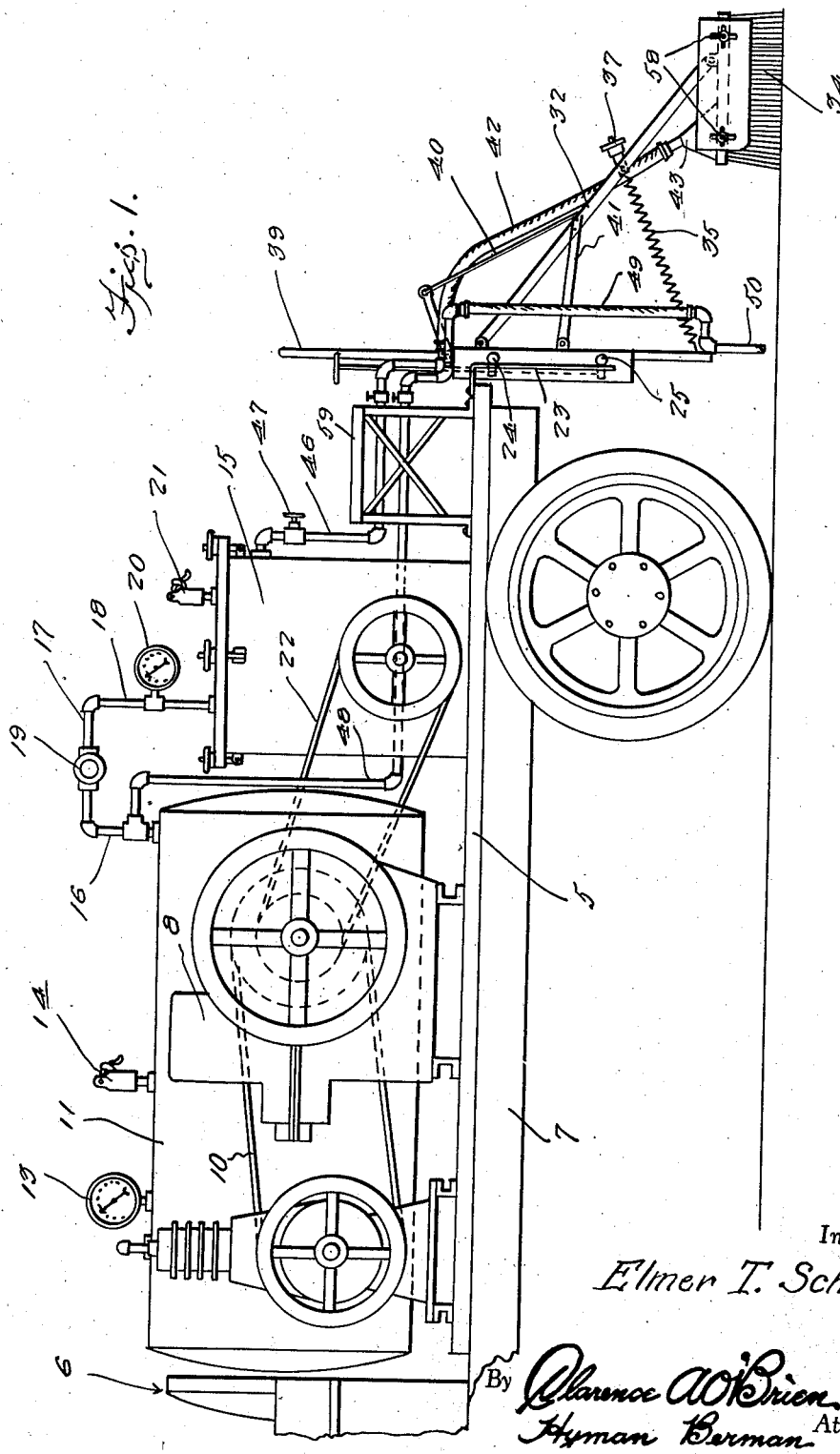
Figure 1 is a side elevational view illustrating the application of the invention.
Figure 2:
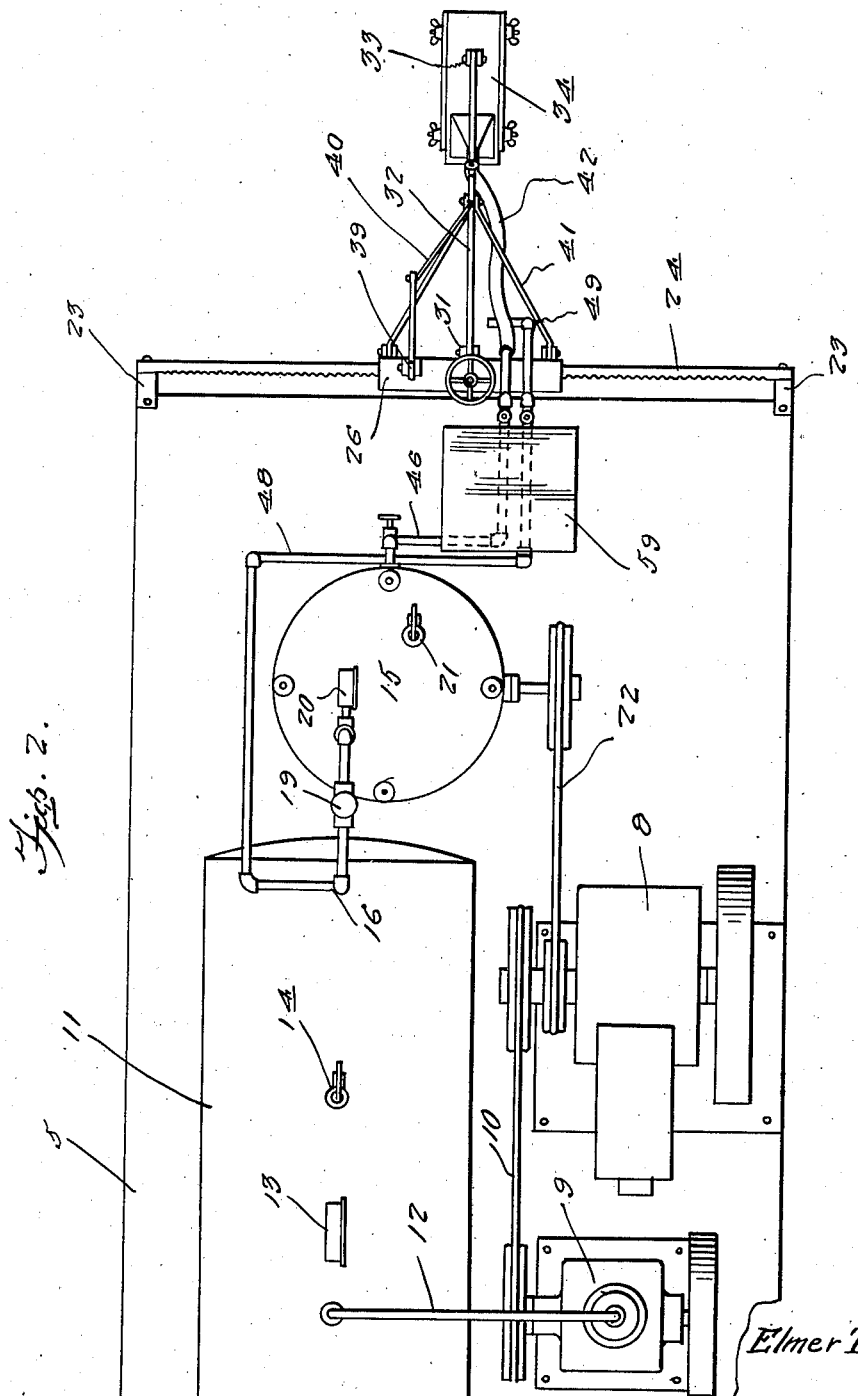
Figure 2 is a top plan view of the invention.
Figure 3:
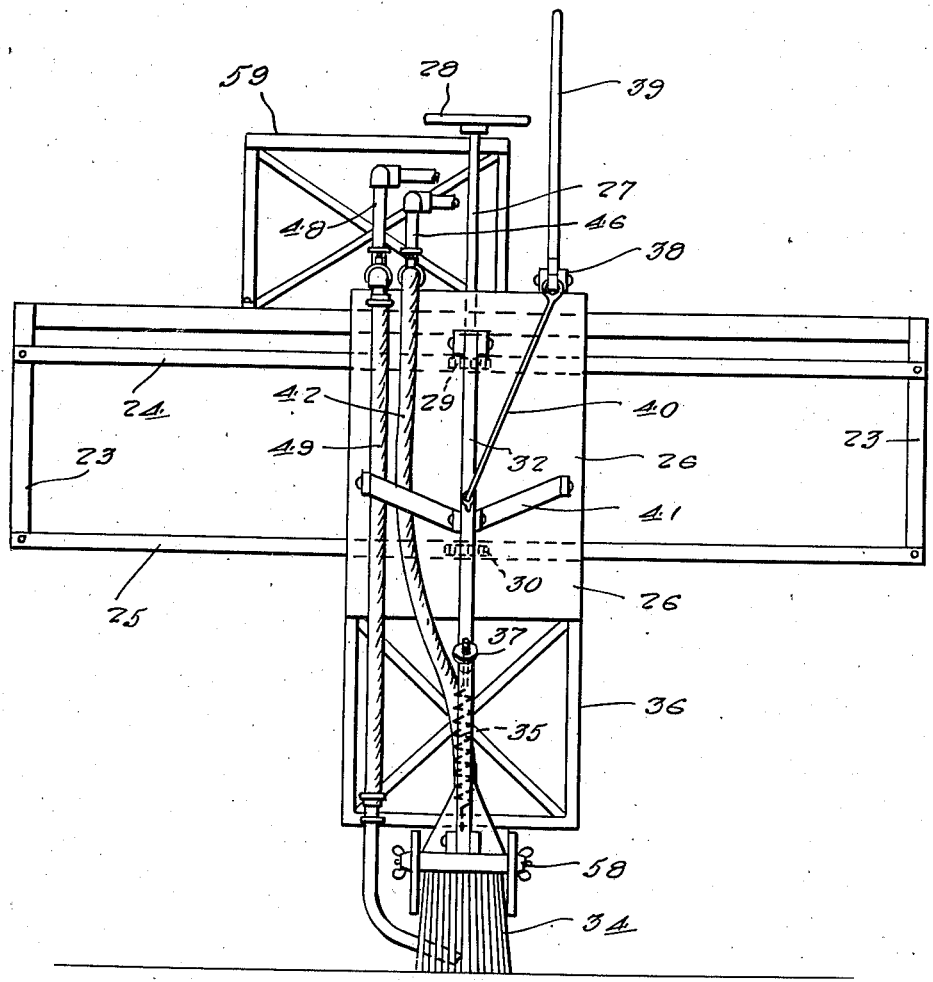
Figure 9:
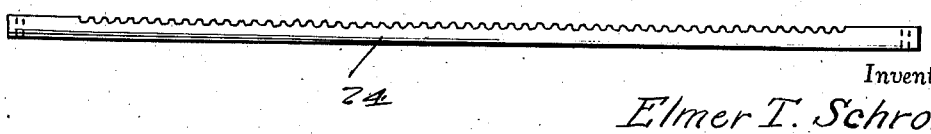
Figure 9 is an elevational view of a rack bar.

Referring to the drawings by reference numerals, it will be seen that the device comprises a platform 5 adapted to be mounted on the rear of a vehicle, preferably a motor truck, indicated generally by the reference numeral 6, with the platform 5 suitably supported on the chassis frame 7 of the vehicle.

Suitably mounted on the platform 5 is a prime mover 8, the same being in the form of an internal combustion engine.

Also mounted on the platform 5 is an air compressor 9 driven from the prime mover 8 in any suitable manner, preferably through the medium of a belt and pulley drive 10, as shown.

The compressor 9 maintains air under pressure within a reservoir tank 11 also suitably mounted on the platform 5, the compressor 9 being connected with the tank 11 through the medium of a pipe or conduit 12. The reservoir tank 11 is suitably equipped with an air gauge 13 and a safety valve 14.

Also conveniently mounted on the platform 5 is a container 15 for paint, into which air under pressure is introduced from the tank 11 through the medium of piping 16, 17 and 18. In the piping 17 there is suitably provided an automatic air regulating reducer 19 of any suitable form and construction, while connected with the piping 18 is a pressure gauge 20.

The paint container 15 is also provided with a safety valve 21. Also in accordance with the present invention, the paint container 15 is provided internally with a driven agitator of any suitable construction and this agitator is driven from the prime mover 8 through the medium of any suitable driving mechanism, preferably a belt and pulley drive mechanism 22, as shown.

Suspended from the rear edge of the platform 5, at the corners of said platform, preferably, are brackets 23 to which are suitably secured, adjacent their upper ends, the respective opposite ends of a rack bar 24, while spaced downwardly from the rack bar 24 and secured at its respective opposite ends to the lower end portions of the brackets 23 is a rack bar 25, the bars 24 and 25 being spaced rearwardly with respect to the truck through the medium of the brackets 23, as shown.

Slidably supported on the bars 24 and 25 for movement transversely with respect to the platform 5, is a casing 26 in which is suitably journaled the lower end of a shaft 27. The shaft 27, at its upper end, is equipped with a turn wheel 28, while the portion of the shaft within the casing 26 is provided with pinions 29, 30, which are in constant mesh with the teeth of the rack bars 24, 25, as clearly shown in Figures 4 and 5.

It will thus be seen that by turning the shaft 27, the casing 26 will be caused to shift laterally or transversely with respect to the platform and associated vehicle, to the desired adjustment.

Pivoted at one end to the casing 26, adjacent the upper end of the casing and as indicated at 31, is a bar or arm 32 to the lower end of which is pivoted, as at 33, the head of a brush 34, which latter may be of any suitable bristle type, and which is provided for applying the paint to the road surface in ribbon form for making a traffic stripe on the road surface.

For yieldably retaining the brush 34 in wiping engagement with the road surface, there is provided an adjustable spring device consisting of a spring 35 anchored at one end to the lowermost rail of a skeleton frame structure 36 that is carried by and depends from the lower edge or bottom of the casing 26. At its other end the spring is connected with the arm 32 through the medium of a suitable spring tension adjusting device 37.

For raising the brush 34 out of engagement with the ground, there is pivotally mounted on the top of the casing 26, as at 38, a lever 39, one end of which is connected through the medium of a link 40 with an intermediate portion of the arm or bar 32. Obviously, by pulling back on the lever 39, or in other words, by causing the lever 39 to swing toward the left in Figure 1, the brush 34, against the action of the spring 35, will be raised out of contact with the ground.

The arm 32 is also braced with respect to the casing 26 through the medium of brace rods 41, which respectively are pivoted at one end to the casing 26 and at a relatively opposite end to one side of an intermediate portion of the arm or bar 32.

For feeding paint under pressure to the bristles of the brush 34, there is provided a flexible conduit 42 on one end of which is a substantially funnel-shaped spout 43, which at its discharge end is provided with apertured attaching flanges through the medium of which and fastening elements 44, the spout is secured to the head of the brush 34 over openings 45 formed in said head and extending therethrough for the passage of the paint through the head and onto the bristles of the brush for subsequent application to the road surface.

Leading from the paint container 15 is a discharge conduit piping or feed line 46, to one end of which is suitably coupled the flexible hose or tube 42. In the line 46 is suitably arranged a control valve 47.

From the above, it will be seen that with the device in operation, air under pressure will be used for forcing the paint from the container 15 and through the line 46 on to the brush 34, to be applied by the brush to the road surface for striping the surface.

Also in accordance with the present invention, means is provided whereby air under pressure may be used for cleaning the roadway in advance of the brush 34. To this end, there is tapped into the piping 16 an air conduit line 48 to which is connected a flexible conduit 49, that is also connected with an air discharge nozzle 50 suitably mounted, preferably adjacent the lower corner of the frame 36 and arranged and disposed so as to have its outlet end disposed forwardly of and in the path of the brush 34, for applying air under pressure to the road surface in advance of the brush for cleaning said surface immediately prior to the application of the paint thereto.

It will, therefore, be appreciated that with a device of this character, the road surface is cleaned and painted in substantially a single operation.

If desired, and to aid the driver of the vehicle, there may be suitably mounted at the front of the vehicle a guide assembly, which as shown in Figure 8, consists of a cross bar 51 that may be secured, for example, to the front bumper of the truck in any suitable manner.

Pivoted to the bar 51, as at 52, is an arm 53 that is braced relative to the bar 51 through the medium of a diagonal brace 54 pivoted at one end to the arm 53, adjacent the free end of the latter and at a relatively opposite end pivoted, as at 55, to the bar 51. Suitably mounted on the free end of the arm 53 is a surface contact roller 56.

Also, if desired, and as shown, the brush 34 may be provided on opposite sides thereof with guard plates 57 that are secured at the desired vertical adjustment through the medium of bolt and slot means, indicated generally by the reference numeral 58. The purpose of the guard plates 57 is to prevent lateral spreading of the bristles of the brush and thus prevent making the paint stripe too wide, as might otherwise occur as the brush passes over a raised part or protuberance in the road surface.

There is suitably mounted at the rear of the platform 5 any suitably constructed seat 59 for the use of the attendant.

It is thought that a clear understanding of the construction, utility and advantages of an invention of this character will be had without a more detailed description.

Having thus described the invention, what is claimed as new is:

1. In combination with a vehicular body, laterally spaced brackets secured to said body at the rear end thereof, a rack bar supported horizontally between said brackets, a member slidably supported by said rack bar and movable therealong, a shaft carried by said member and provided with a pinion engaging the teeth of the rack bar for effecting an adjustment of said member transversely relative to the truck body, an arm pivoted at one end to said member, and a road engaging brush pivoted to the free end of said arm.

2. In combination with a vehicular body, laterally spaced brackets secured to said body at the rear end thereof, a rack bar supported horizontally between said brackets, a member slidably supported by said rack bar and movable therealong, a shaft carried by said member and provided with a pinion engaging the teeth of the rack bar for effecting an adjustment of said member transversely relative to the truck body, an arm pivoted at one end to said member, a road engaging brush pivoted to the free end of said arm, a conduit for air under pressure carried by said member, and a nozzle on the end of said conduit arranged in advance of and in substantial alignment with said brush for applying air to a road surface for cleaning the same.

3. In combination with a vehicle, a rack bar supported transversely of the vehicle at the rear end of the latter, a member mounted on the rack bar for movement therealong transversely of the vehicle, a shaft carried by said member and provided with a pinion engaging the teeth of the rack bar for effecting an adjustment of said member transversely of the vehicle, an arm extending downwardly from said member, and a road surface marking element on the free end of said arm.

4. In combination with a vehicle, a rack bar supported transversely of the vehicle at the rear end of the latter, a member mounted on the rack bar for movement therealong transversely of the vehicle, a shaft carried by said member and provided with a pinion engaging the teeth of the rack bar for effecting an adjustment of said member transversely of the vehicle, an arm extending downwardly from said member, a brush on the free end of said arm, a container for paint mounted on said vehicle, and a conduit connected at its respective opposite ends with said paint container and said brush for feeding paint to the brush for application to a road surface.

5. In combination with a vehicle, a rack bar supported transversely of the vehicle at the rear end of the latter, a member mounted on the rack bar for movement therealong transversely of the vehicle, a shaft carried by said member and provided with a pinion engaging the teeth of the rack bar for effecting an adjustment of said member transversely of the vehicle, an arm extending downwardly from said member, a brush on the free end of said arm, a container for paint mounted on said vehicle, a feed conduit connected at one end with the container and having at its respective opposite end a flared nozzle secured to the head of said brush, and said brush head having openings for the passage of paint therethrough onto the bristles of the brush, and means connected with the paint container for forcing paint under pressure therefrom and through said conduit onto the brush for application to a road surface.

6. In combination with a vehicle, a rack bar supported transversely of the vehicle at the rear end of the latter, a member mounted on the rack bar for movement therealong transversely of the vehicle, a shaft carried by said member and provided with a pinion engaging the teeth of the rack bar for effecting an adjustment of said member transversely of the vehicle, an arm extending downwardly from said member, a brush on the free end of said arm, a container for paint mounted on said vehicle, a feed conduit connected at one end with the container and having at its respective opposite end a flared nozzle secured to the head of said brush, said brush head having openings for the passage of paint therethrough onto the bristles of the brush, means connected with the paint container for forcing paint under pressure therefrom and through said conduit onto the brush for application to a road surface, and means carried by said transversely movable member and disposed in advance of said brush for cleaning the road surface prior to the application of paint thereto.

7. In combination with a vehicle, a rack bar supported transversely of the vehicle at the rear end of the latter, a member mounted on the rack bar for movement therealong transversely of the vehicle, a shaft carried by said member and provided with a pinion engaging the teeth of the rack bar for effecting an adjustment of said member transversely of the vehicle, an arm extending downwardly from said member, a brush on the free end of said arm, a container for paint mounted on said vehicle, a feed conduit connected at one end with the container and having at its respective opposite end a flared nozzle secured to the head of said brush, said brush head having openings for the passage of paint therethrough onto the bristles of the brush, means connected with the paint container for forcing paint under pressure therefrom and through said conduit onto the brush for application to a road surface, means carried by said transversely movable member and disposed in advance of said brush for cleaning the road surface prior to the application of paint thereto, and means connected with said arm for raising said brush out of contact with the road surface.

8. In combination with a vehicle, a rack bar supported transversely of the vehicle at the rear end of the latter, a member mounted on the rack bar for movement therealong transversely of the vehicle, a shaft carried by said member and provided with a pinion engaging the teeth of the rack bar for effecting an adjustment of said member transversely of the vehicle, an arm extending downwardly from said member, a brush on the free end of said arm, a container for paint mounted on said vehicle, a feed conduit connected at one end with the container and having at its respective opposite end a flared nozzle secured to the head of said brush, said brush head having openings for the passage of paint therethrough onto the bristles of the brush, means connected with the paint container for forcing paint under pressure therefrom and through said conduit onto the brush for application to a road surface, means carried by said transversely movable member and disposed in advance of said brush for cleaning the road surface prior to the application of paint thereto, means connected with said arm for raising said brush out of contact with the road surface, and a spring tension device connected with said arm for yieldably urging said brush into contact with the road surface.

ELMER T. SCHROTH.